(12) United States Patent
Hinkle

(10) Patent No.: US 6,725,488 B2
(45) Date of Patent: Apr. 27, 2004

(54) LOADING BRIDGE CONTROL SYSTEM AND METHOD

(76) Inventor: Britt C. Hinkle, 3109 Royal Ct., Corpus Christi, TX (US) 78414

( * ) Notice: Subject to any disclaimer, the term of this patent is extended or adjusted under 35 U.S.C. 154(b) by 0 days.

(21) Appl. No.: 10/071,366

(22) Filed: Feb. 6, 2002

(65) Prior Publication Data

US 2003/0145400 A1 Aug. 7, 2003

(51) Int. Cl.[7] .................................................. E01D 1/00
(52) U.S. Cl. ........................................... 14/71.5; 14/71.3
(58) Field of Search .............................. 14/69.5, 71.1, 14/71.5, 72.5

(56) References Cited

U.S. PATENT DOCUMENTS

| | | | |
|---|---|---|---|
| 3,060,471 A | * | 10/1962 | der Yuen et al. ............ 14/71.5 |
| 3,123,167 A | * | 3/1964 | Lichti ........................ 180/6.5 |
| 3,404,417 A | * | 10/1968 | Wollard et al. ............. 14/71.5 |
| 3,462,784 A | * | 8/1969 | Seipos ........................ 14/71.5 |
| 3,561,030 A | * | 2/1971 | Seipos ........................ 14/71.5 |
| 3,577,838 A | * | 5/1971 | Van Marle ................. 14/71.5 |
| 3,683,440 A | | 8/1972 | Xenakis |
| 3,808,626 A | * | 5/1974 | Magill ........................ 14/71.5 |
| 3,883,918 A | * | 5/1975 | Magill ........................ 14/71.5 |
| 4,306,314 A | * | 12/1981 | Griffiths ..................... 398/110 |
| 4,318,197 A | * | 3/1982 | Drozd ........................ 14/71.5 |
| 4,572,550 A | * | 2/1986 | Harder ........................ 285/47 |
| 5,084,936 A | * | 2/1992 | Thomas, Jr. ................ 14/71.5 |
| 5,226,204 A | | 7/1993 | Schoenberger |
| 6,195,826 B1 | * | 3/2001 | LeBaron et al. ............ 14/71.5 |

* cited by examiner

Primary Examiner—Gary S. Hartmann
(74) Attorney, Agent, or Firm—G. Turner Moller

(57) ABSTRACT

A loading bridge includes motors for moving the open end forward, backward, left, right, up and down so the open end can be aligned with a passenger door of an airplane. To minimize collisions between the loading bridge and the airplane, a deadman switch is provided under the control of a second person on the ground adjacent the open end of the loading bridge. So long as the second person holds the deadman switch in a preferred position, the motors are operative to drive the loading bridge forward, backward, left and right. When the second person releases the deadman switch, the loading bridge can no longer move in these directions.

14 Claims, 1 Drawing Sheet

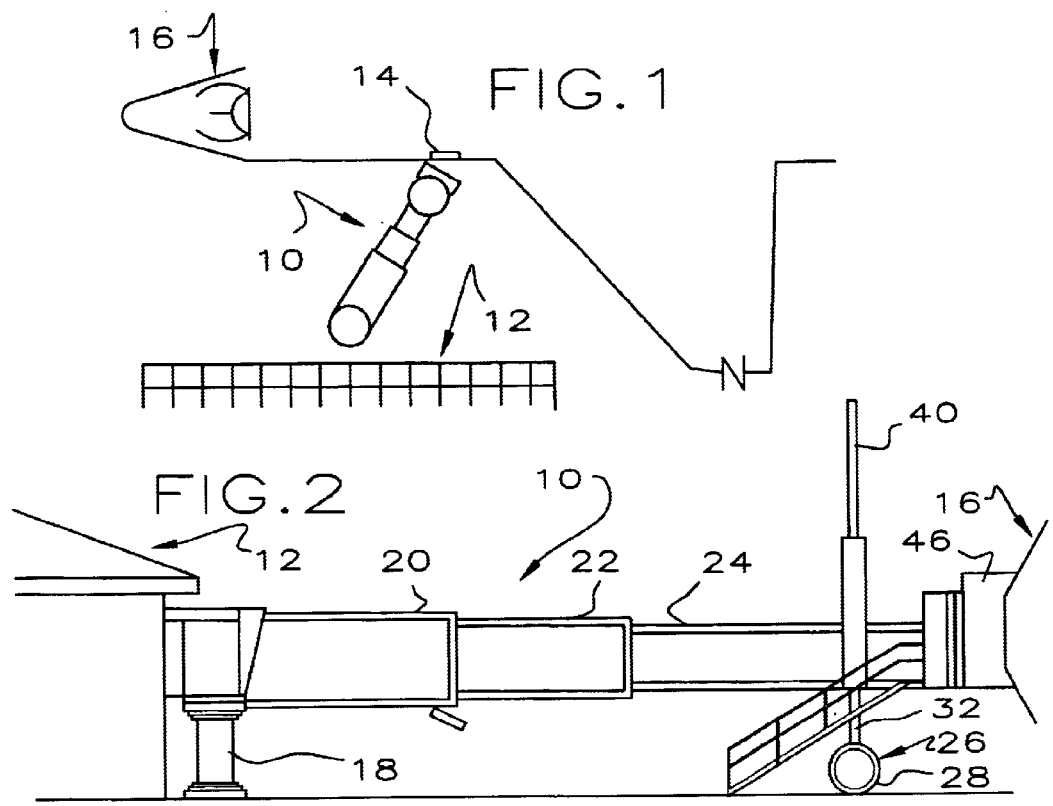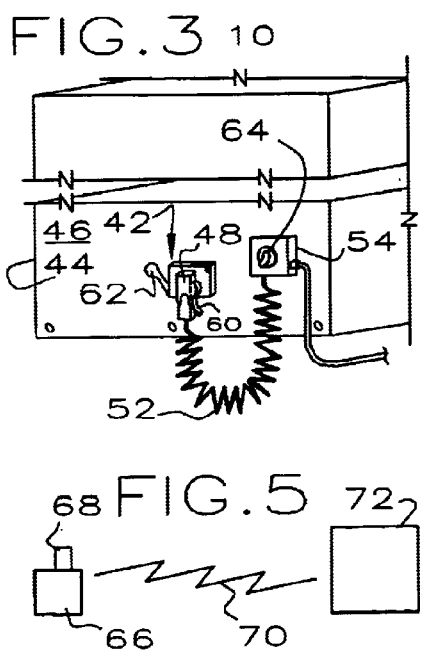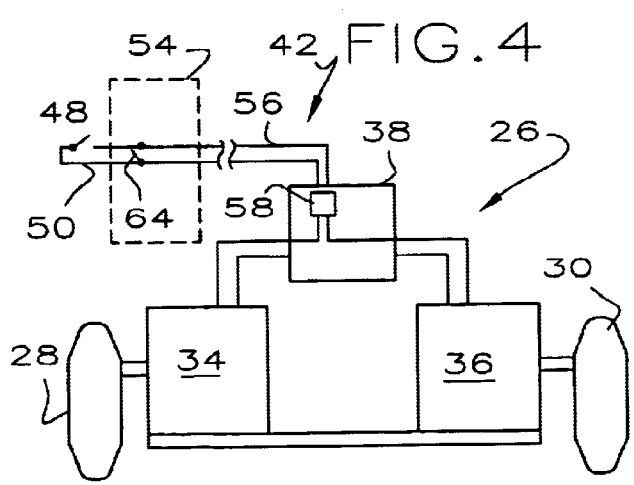

LOADING BRIDGE CONTROL SYSTEM AND METHOD

This invention is an improved control system for a passenger loading bridge through which passengers walk to board or deplane an airplane and an improved method of operating a loading bridge.

BACKGROUND OF THE INVENTION

Modern airports are constructed so that passengers walk between full sized commercial airplanes and a terminal building through a loading bridge. The loading bridge is normally retracted adjacent the terminal building when not in use. When an airplane is at a loading location, the loading bridge is driven by an operator so the passageway through the loading bridge aligns with the airplane door and is close enough to the airplane so passengers can safely walk between them.

Conventional loading bridges are self propelled by suitable electric motors under the control of an operator located inside the loading bridge. A major disadvantage of conventional loading bridges is the operator station is inside the loading bridge a few feet from the open end of the runway. Although there are windows adjacent the operator's station, the operator has relatively poor visibility in all directions except straight out the windows. As a practical matter, the bridge operator must have some additional input in order to align the loading bridge and the airplane door in a safe, repeatable manner.

In practice, a person on the ground adjacent the airplane stands in front of the open runway end in the intended path of the loading bridge or in plain sight adjacent the window and, with hand signals, directs the operator left or right, forward or back. When the loading bridge comes within a few feet of the airplane door, the person giving directions must move out of the way or become pinned between the loading bridge and the airplane. Thus, in the last five feet or so of movement of the loading bridge, the bridge operator can only see down the runway or out the window.

Even though loading bridge operators do their best to position the loading bridge adjacent the airplane door and not damage the airplane, collisions occur with distressing regularity. The damage that can occur is not only to the airplane door or the structural components adjacent the door. Many airplanes have pitot tubes or other sensors on the outside of the airplane in locations that can be impacted by a moving loading bridge.

A major United States airline, operating flights from about a thousand gates, has one collision a week between a loading bridge and an airplane. The cost of these collisions varies substantially, as one would expect. The cost of repairing the airplane runs from a few hundred dollars to several tens of thousands of dollars. Often, the airplane cannot be flown with passengers until repairs are made, causing flights to be cancelled for at least a day and occasionally as much as a week. The total cost of a collision includes the cost of repair, lost revenue while the plane is out of service, the cost of ferrying the plane to a repair location or the cost of ferrying mechanics and parts to the airplane and the like. The total cost of a collision, including lost revenue, is normally much greater than the parts and labor necessary to repair the airplane.

Similar problems occur when retracting the loading bridge. The parking sites for airplanes are selected and marked on the tarmac so planes will not run into the loading bridge when the loading bridge is fully retracted. It occasionally happens that loading bridges are not fully retracted because the bridge operator cannot see whether it is completely docked and planes run into the loading bridge, it also occasionally happens that loading bridges are not fully retracted but are retracted enough to handle the normal plane that appears at a gate. When a different, larger plane taxis up to the gate, they will occasionally hit a loading bridge that is retracted enough for planes that normally use the gate. These collisions are Particularly expensive to repair because the plane is large, heavy and moving.

Another category of collisions occurs when the loading bridge is in the process of being retracted from its operative position toward its stowed position. Sometimes, the loading bridge backs into objects temporarily left under the loading bridge such as baggage carts, generator vehicles, or the like. In some situations, there are physical connections between the loading bridge and the airplane, such as electrical supply conduits. If these are not uncoupled and retracted before the loading bridge starts to move, the airplane can be damaged by the uncoupled physical connections. In brief, there are numerous ways for an airplane or other equipment to be damaged or people to be hurt because the loading bridge operator has poor visibility.

The straight forward solution to this problem is to provide cameras and sensors reporting to an operator's station so the operator can view various parts of the loading bridge, the airplane and the like, as shown in exemplary U.S. Pat. Nos. 3,683,440 and 5,226,204.

SUMMARY OF THE INVENTION

In this invention, a deadman switch is provided on a tether on the outside of the loading bridge under the control of the person on the ground, often called a ramp agent, who normally gives hand signals to the loading bridge k operator. So long as the switch is held in a predetermined position, the control circuit leading to the loading bridge motors work normally. When the switch is released or moved to another position, the control circuit is interrupted or otherwise manipulated to stop the loading bridge for movement in directions which will cause collisions with the airplane.

Thus, in a preferred embodiment, the ramp agent giving signals holds the deadman switch closed while standing below the airplane door or in plain sight through a window and directs the loading bridge operator with suitable hand signals. When the loading bridge approaches the airplane so it is no longer safe to stand in front of the runway, the person giving directions stands aside, holding the switch closed. If the loading bridge continues to move in a safe manner, the person on the ground continues to hold the switch closed. In the event it appears to the person on the ground that the loading bridge is in danger of running into the airplane, the person lets loose of the switch, causing the loading bridge to stop. In this manner, the person who is closest to the scene and who has the best view has the power to stop the loading bridge immediately.

The deadman switch of this invention preferably also operates when moving the loading bridge in a retracting direction so the person on the ground can prevent damages to the airplane and/or to people or equipment behind or underneath the loading bridge during movement of the loading bridge.

It is an object of this invention to provide an improved loading bridge.

A further object of this invention is to provide an improved method of moving a loading bridge.

A further object of this invention is to provide an improved control system for a loading bridge.

A more specific object of this invention is to provide a switch for a loading bridge control system which requires an additional person to hold the switch in a predetermined position to allow the loading bridge to move.

These and other objects and advantages of this invention will become more apparent as this description proceeds, reference being made to the accompanying drawings and appended claims.

BRIEF DESCRIPTION OF THE DRAWINGS

FIG. 1 is a top view of an airplane and loading bridge of this invention;

FIG. 2 is a side view of the loading bridge of FIG. 1;

FIG. 3 is an enlarged side view of the open end of the loading bridge showing a preferred location for a deadman switch of this invention;

FIG. 4 is a schematic view of a propulsion and control system of this invention incorporating a deadman switch; and FIG. 5 is a schematic view of another embodiment of this invention.

DETAILED DESCRIPTION

Referring to FIGS. 1–4, a conventional loading bridge 10 is attached to a terminal building 12 and is movable between a stowed or retracted position adjacent the building 12 and an operative position juxtaposed to and aligned with a door 14 on an airplane 16. The loading bridge 10 is illustrated as having a pedestal 18 adjacent the building 12 and a plurality of telescoping sections or galleries 20, 22, 24 which extend outwardly toward the airplane 16 under control of a loading bridge operator.

The forward end of the loading bridge 10 includes a propulsion system 26 for moving the loading bridge toward and away from an operative position adjacent the airplane 16 and a retracted or stowed position away from the airplane 16. The propulsion system 26 includes one or more wheels 28, 30 supporting the forward end of the loading bridge 10 by a suitable support structure 32. The wheels 28, 30 are driven by electric motors 34, 36 under control of a system or console 38 manipulated by the loading bridge operator through suitable handles, joysticks or the like located at an operator's station inside the loading bridge 10 and near its open end. Typically, the loading bridge 10 is driven straight forward or straight rearward by driving the wheels 28, 30 at equal speeds and is turned by driving one of the wheels 28, 30 faster than the other.

The forward end of the loading bridge 10 is raised, lowered or tilted by suitable motors 40 under the control of the loading bridge operator or under control of an automatic mechanism (not shown) so passengers can easily and safely walk between the airplane 16 and the loading bridge 10. As heretofore described, those skilled in the art will recognize the loading bridge 10 as being typical of loading bridges commercially available from manufacturers such as FMC-Jetway of Ogden, Utah.

In this invention, a safety mechanism 42 is provided on the outside of the loading bridge 10 under the control of a second person, often called a ramp agent, that is capable of immediately stopping movement of the loading bridge 10. As shown best in FIG. 3, the safety mechanism 42 is operated by the second person on the outside of the loading bridge 10 adjacent a forward open end 44 of a vestibule 46 comprising the forward end of the loading bridge 10 as seen in FIG. 2. The mechanism 42 is such that the second person can move around relative to and adjacent the open end 44 of the loading bridge 10 to allow the second person the best view of the approach between the loading bridge 10 and the airplane 16 and to allow the second person the best view of the expected path of movement of the loading bridge, in either forward, backward, left or right directions.

The mechanism 42 is preferably a hand held switch 48 forced into in a closed position by the second person to allow operation of the electric motors 34, 36 and released to stop the motors 34, 36. Switches of this type are often known as deadman switches that act to stop operation of machinery if the operator dies or leaves an operator's station. The switch 48 connects by a wire or wires 50 inside an insulated coiled cord 52 to a junction box 54 on the outside of the loading bridge 10. Inside the junction box 54, a connection is made to a wire or wires 56 leading to the system 38 controlling operation of the propulsion means 26. Inside the control system 38, the wires 56 connect to a relay 58 or other suitable device to disable the electric motors 34, 36 when the switch 48 is manipulated by the ramp agent.

The switch 48 is preferably of a type having a handle or button 60 which is depressed by the ramp agent to enable operation of the motors 34, 36. In other words, the ramp agent preferably holds the handle 60 closed during operation of the propulsion means 26 and, to stop the loading bridge 10, simply releases the handle 60 which moves by spring bias to an deactivating position. Although the switch 48 may be of any suitable type, it is preferably a Model GTP-8392 switch from Gammon Technical Products, Inc. of Manasquan, N.J. The switch 48 is conveniently hung on a hook or bracket 62 when not in use.

It will accordingly be seen that the switch 48 controls operation of the motors 34, 36 and thus controls forward, backward, left and right movement of the loading bridge 10. The switch 48 preferably does not control movement of the motors 40 which control up, down and tilting movement of the vestibule 46 which remain under the sole control of the loading bridge operator. The reason is that the operator's station is typically located immediately inside the vestibule adjacent the open end 44 of the loading bridge 10 and thus provides the best view of the relative vertical position of the walkway inside the vestibule 46 and the open door 16 of the airplane.

Operation of this invention should now be apparent. When a plane has taxied up to its marked position on the tarmac, under hand signal direction by the ramp agent, the ramp agent removes the switch 48 from its stowed position on the hook 62 and depresses the handle 60 to its operative position allowing operation of the motors 34, 36. The ramp agent stands in a position in direct view of the loading bridge operator inside the vestibule 46 and, with hand signals, gives directions to the loading bridge operator. When the open end 44 of the loading bridge 10 approaches the airplane 16, the ramp agent moves out of the path of movement of the loading bridge, all the while depressing the handle 60 to its motor activating position. In the event the loading bridge 10 moves, or threatens to move, to an unsafe position or to a position that will imminently collide with the airplane, the ramp agent releases the handle 60 which thereby stops the motors 34, 36. When the open end 44 of the loading bridge has reached a satisfactory passenger transferring position relative to the airplane, the ramp agent simply releases the handle 60 and hangs the switch 48 on the hook 62. This prevents further forward, backward, left or right movement of the loading bridge 10 but allows the loading bridge operator to raise, lower or tilt the vestibule 46 under control of the motors 40.

When it is time to retract the loading bridge 10, a similar operation occurs. The ramp agent removes the switch 48 from the hook 62, depresses the handle 60 and gives appropriate directions to the loading bridge operator. In the event a dangerous situation develops within eyesight of either the loading bridge operator or the ramp agent, either person can stop the loading bridge. When the loading bridge 10 has been retracted to its stowed position, the ramp agent simply hangs the switch 48 on the hook 62.

In the event the switch 48 malfunctions, a secondary mode of operation is provided by a key switch 64 on the junction box 54. Turning the key switch 64 to its operating position connects the wires 50, 56 so the loading bridge 10 can be operated in a conventional manner. In other words, the key switch 64 bypasses the switch 48. A suitable key switch is available from Radio Shack as Catalog Number 49-515.

It will be apparent that the safety mechanism may be of any suitable type to accomplish the function. For example, as shown in FIG. 5, a garage door type transmitting device 66 having an operating button or handle 68 may deliver a radio signal represented by the arrow 70 to a receiver 72 which enables the control system 38 to drive the electric motors 34, 36 and thereby propel the loading bridge 10. When the operating button or handle 68 is released, the device 66 no longer transmits, the receiver 72 no longer receives and the control system 38 stops operation of the loading bridge 10.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. In combination,
    a loading bridge having an open end for transferring passengers between an airplane and the loading bridge;
    a system for propelling the loading bridge under the control of a first person inside the loading bridge, between a stowed position and a position juxtaposing the open end adjacent the airplane; and
    a safety mechanism having a first position allowing the propelling system to operate and a second position for interrupting the propelling system and stopping movement of the loading bridge, the safety mechanism being operable from adjacent the open end of the load bridge from a location out of reach of the first person at the operator's station by a second person having a better view of a gap between the airplane and the open end of the loading bridge.

2. The combination of claim 1 wherein the safety mechanism is connected to the loading bridge by a flexible cord allowing the second person to be positioned outside the loading bridge adjacent the airplane.

3. The combination of claim 1 wherein the second position comprises a normal position and the safety mechanism includes an operator manipulable by the second person for moving the safety mechanism to the first position.

4. The combination of claim 1 wherein the safety mechanism comprises a switch having an operating member movable between a first switch position corresponding to the first position and a second normal switch position corresponding to the second position and means biasing the operating member toward the second normal position.

5. The combination of claim 4 wherein the propelling system comprises a mechanism for moving the open end forward, backward, left, and right, and the switch controls movement of the open runway end forward, backward, left and right.

6. The combination of claim 5 wherein the loading bridge further comprises a mechanism for elevating the open end up and down, the mechanism being under the sole control of the first person.

7. The combination of claim 1 wherein the loading bridge comprises an operator's station inside the loading bridge and the safety mechanism is controlled from outside the loading bridge.

8. The combination of claim 1 wherein the safety mechanism provides a transmitter and the propelling system comprises a receiver, the propelling system being operable only upon receipt of a signal from the transmitter.

9. The combination of claim 1 wherein the system for propelling the loading bridge comprises an operator's station inside the loading bridge and the safety mechanism is operated from a location outside the loading bridge adjacent the airplane.

10. A control system for a loading bridge having an open end for transferring passengers between an airplane and the loading bridge and a system for propelling the loading bridge, under the control of a bridge operator located at an operator's station, between a stowed position and a position juxtaposing the open end adjacent an airplane, comprising a safety mechanism, out of reach of the operator's station and operable by a person outside the loading bridge having a better view of a a between the airplane and the loading bridge and adjacent the open end, having a first position allowing the propelling system to operate and a second position for interrupting the propelling system and stopping movement of the loading bridge.

11. The control system of claim 10 wherein safety mechanism comprises a deadman switch held in the first position by the person outside the loading bridge and movable when released by the person outside the loading bridge to the second position.

12. The control system of claim 11 wherein the propelling system comprises a mechanism for moving the open end forward, backward, left, and right, and the switch controls movement of the open runway end forward, backward, left and right.

13. The combination of claim 12 wherein the loading bridge further comprises a device for elevating the open end, the device being under the sole control of the bridge operator.

14. The combination of claim 10 wherein the operator's station is near the open end of the loading bridge.

* * * * *

UNITED STATES PATENT AND TRADEMARK OFFICE
CERTIFICATE OF CORRECTION

PATENT NO. : 6,725,488 B2 Page 1 of 1
DATED : April 27, 2004
INVENTOR(S) : Britt C. Hinkle It is certified that error appears in the above-identified patent and that said Letters Patent is hereby corrected as shown below:

<u>Column 6,</u>
Line 39, should read -- better view of a gap between the airplane and the loading --.

Signed and Sealed this

Twenty-ninth Day of June, 2004

JON W. DUDAS
*Acting Director of the United States Patent and Trademark Office*